US012639112B2

(12) United States Patent　　　　(10) Patent No.:　US 12,639,112 B2
Eker et al.　　　　　　　　　　　　(45) Date of Patent:　May 26, 2026

(54) METHODS AND SYSTEMS TO DETERMINE AND OPTIMIZE RESERVOIR SIMULATOR PERFORMANCE IN A CLOUD COMPUTING ENVIRONMENT

(71) Applicant: LANDMARK GRAPHICS CORPORATION, Houston, TX (US)

(72) Inventors: Erdinc Eker, Golden, CO (US); Qinghua Wang, Katy, TX (US); Travis St. George Ramsay, Hockley, TX (US); Steven Paul Crockett, Sugar Land, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 747 days.

(21) Appl. No.: 17/040,012

(22) PCT Filed: Apr. 18, 2018

(86) PCT No.: PCT/US2018/028163
　　§ 371 (c)(1),
　　(2) Date: Sep. 21, 2020

(87) PCT Pub. No.: WO2019/203822
　　PCT Pub. Date: Oct. 24, 2019

(65) Prior Publication Data
　　US 2021/0019189 A1　　Jan. 21, 2021

(51) Int. Cl.
　　*G06F 9/50*　　　　(2006.01)
　　*G01V 20/00*　　　(2024.01)
　　　　(Continued)

(52) U.S. Cl.
　　CPC ............ *G06F 9/5005* (2013.01); *G01V 20/00* (2024.01); *G06F 9/48* (2013.01); *G06F 9/4806* (2013.01);
　　　　(Continued)

(58) Field of Classification Search
　　CPC ........ G06F 9/48; G06F 9/4806; G06F 9/4843; G06F 9/485; G06F 9/4856; G06F 9/4881;
　　　　(Continued)

(56) References Cited

U.S. PATENT DOCUMENTS

| 8,768,678 B1 * | 7/2014 | Mihalache | .............. | G06F 30/20 717/149 |
| 11,473,407 B2 * | 10/2022 | Tang | ........................ | E21B 43/00 |

(Continued)

FOREIGN PATENT DOCUMENTS

| EP | 3287901 A1 | 2/2018 |
| WO | 2007061618 A2 | 5/2007 |

(Continued)

OTHER PUBLICATIONS

Mohaghegh et al, "Reservoir Simulation and Modelling Based on Pattern Recognition" SPE 143179, 2011, Society of Petroleum Engineers, pp. 1-13 (Year: 2011).*

(Continued)

*Primary Examiner* — Charles M Swift
(74) *Attorney, Agent, or Firm* — NOVAK DRUCE CARROLL LLP

(57) ABSTRACT

Disclosed are systems and methods for allocating resources for executing a simulation. These include receiving a simulation for execution, calculating an initial runtime of an initial time step of the simulation, determining a total runtime of the simulation based on the initial runtime, selecting a runtime model based on the initial time step, total runtime, or a parameter of the simulation, identifying, based on the selected runtime model, an allocation of a resource providing an increase in runtime speed, allocating the identified resource, and executing the simulation using the allocated resource.

20 Claims, 7 Drawing Sheets

(51) Int. Cl.

| | |
|---|---|
| *G06F 9/48* | (2006.01) |
| *G06N 3/04* | (2023.01) |
| *G06F 30/27* | (2020.01) |
| *G06F 113/08* | (2020.01) |
| *G06Q 10/04* | (2023.01) |
| *G06Q 10/067* | (2023.01) |
| *G06Q 50/02* | (2012.01) |

(52) U.S. Cl.

CPC ............ *G06F 9/4843* (2013.01); *G06F 9/485* (2013.01); *G06F 9/4856* (2013.01); *G06F 9/4881* (2013.01); *G06F 9/50* (2013.01); *G06F 9/5011* (2013.01); *G06F 9/5027* (2013.01); *G06F 9/505* (2013.01); *G06F 9/5061* (2013.01); *G06F 9/5072* (2013.01); *G06F 9/5077* (2013.01); *G06F 9/5083* (2013.01); *G06N 3/04* (2013.01); *G06F 30/27* (2020.01); *G06F 2113/08* (2020.01); *G06Q 10/04* (2013.01); *G06Q 10/067* (2013.01); *G06Q 50/02* (2013.01)

(58) Field of Classification Search

CPC ........ G06F 9/50; G06F 9/5005; G06F 9/5011; G06F 9/5027; G06F 9/505; G06F 9/5061; G06F 9/5072; G06F 9/5083; G06F 9/5088

See application file for complete search history.

(56) References Cited

U.S. PATENT DOCUMENTS

| | | | | |
|---|---|---|---|---|
| 11,983,094 | B2* | 5/2024 | Downie | .............. G06F 11/3698 |
| 2010/0082142 | A1* | 4/2010 | Usadi | .................... G06N 20/00 |
| | | | | 703/2 |

| | | | | |
|---|---|---|---|---|
| 2012/0232861 | A1 | 9/2012 | Lu et al. | |
| 2013/0325419 | A1 | 12/2013 | Al-Shaikh et al. | |
| 2013/0338985 | A1 | 12/2013 | Garcia et al. | |
| 2014/0281743 | A1 | 9/2014 | Hayder et al. | |
| 2015/0089511 | A1 | 3/2015 | Smith et al. | |
| 2016/0061008 | A1 | 3/2016 | Al-Turki et al. | |
| 2016/0098292 | A1* | 4/2016 | Boutin | .................. G06F 9/4881 |
| | | | | 718/104 |
| 2017/0123855 | A1* | 5/2017 | Li | .......................... G06F 9/5055 |
| 2018/0004868 | A1 | 1/2018 | Adam et al. | |
| 2019/0220253 | A1* | 7/2019 | Pradhan | ................... G06N 3/08 |
| 2020/0380541 | A1* | 12/2020 | Laing | ................. G06Q 30/0244 |
| 2021/0033748 | A1* | 2/2021 | Rowan | .................... G06F 30/27 |

FOREIGN PATENT DOCUMENTS

| | | | |
|---|---|---|---|
| WO | 2007061618 | A3 | 5/2007 |
| WO | 2016112241 | A1 | 7/2016 |
| WO | 2017039680 | A1 | 3/2017 |

OTHER PUBLICATIONS

Canadian Office Action for application No. 3,090,095, issued on Aug. 25, 2021, 6 pages.

Examination Report for British Application No. GB2011201.8, issued on Mar. 15, 2022, 2 pages.

Eldred, Morgan Edward et al.; "Reservoir Simulations in a High Performance Cloud Computing Environment," SPE-167877-MS; Society of Petroleum Engineers; 2014.

International Search report and Written Opinion, PCT PCT/US2018/028163, mailed Jan. 18, 2019.

\* cited by examiner

Number of Cores

Speedup

300

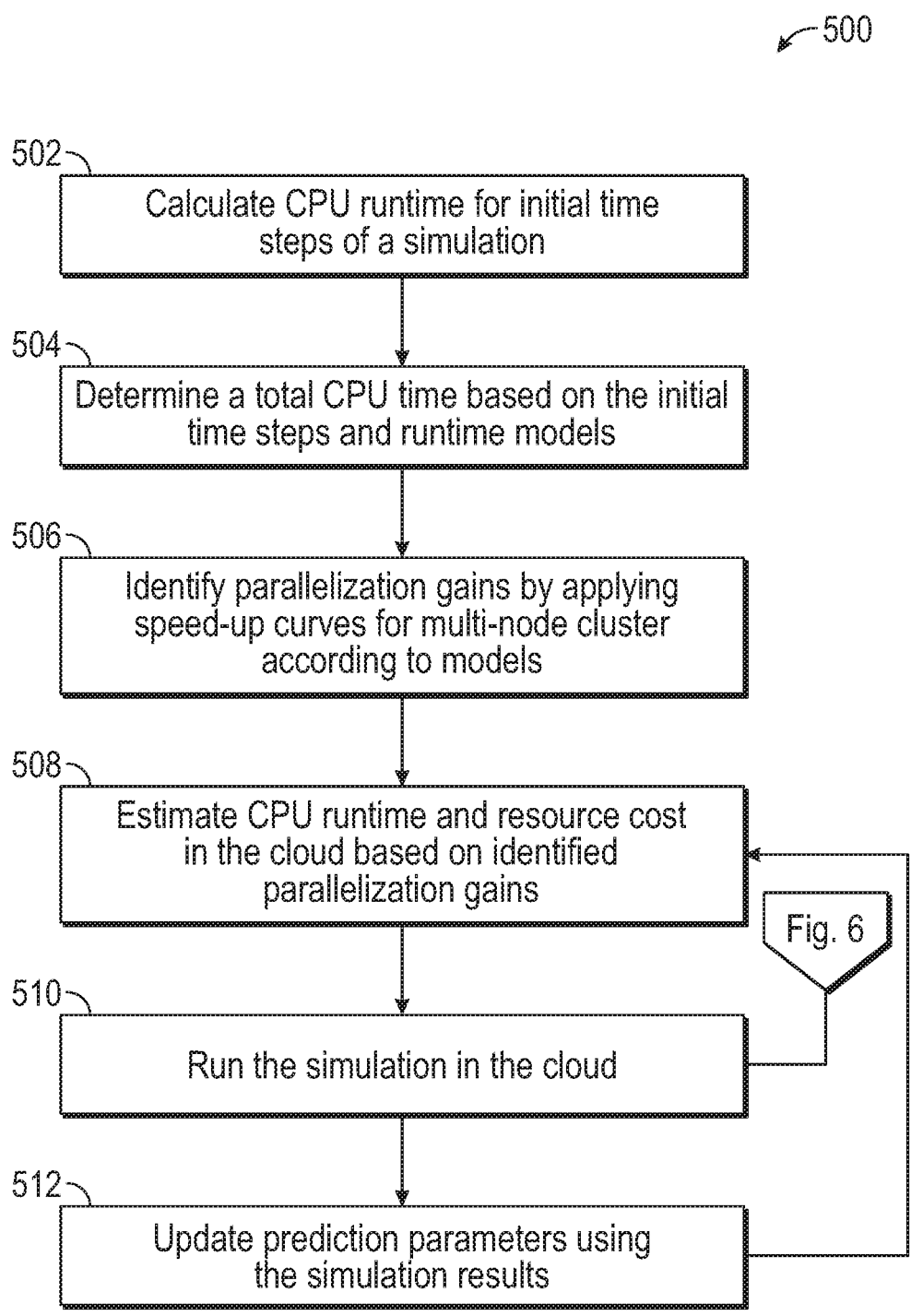

502 — Calculate CPU runtime for initial time steps of a simulation

504 — Determine a total CPU time based on the initial time steps and runtime models 506 — Identify parallelization gains by applying speed-up curves for multi-node cluster according to models 508 — Estimate CPU runtime and resource cost in the cloud based on identified parallelization gains

Fig. 6

510 — Run the simulation in the cloud

512 — Update prediction parameters using the simulation results

METHODS AND SYSTEMS TO DETERMINE AND OPTIMIZE RESERVOIR SIMULATOR PERFORMANCE IN A CLOUD COMPUTING ENVIRONMENT

CROSS-REFERENCE TO RELATED APPLICATIONS

This application is a national stage entry of PCT/US2018/028163 filed Apr. 18, 2018, said application is expressly incorporated herein by reference in its entirety.

TECHNICAL FIELD

The present technology pertains to optimizing resource allocation for simulations run in a cloud computing environment.

BACKGROUND

In the oil and gas industry, reservoir simulation is often run with a limited budget, on a short deadline, or both. Cloud computing offers scalable resource deployment for the running of reservoir simulations but configuration decisions must be made in advance and often without an understanding of the time or cost to complete a reservoir simulation. Further, specialized training and knowledge is often necessary to configure and deploy resources in a manner that minimizes cost or compute time. Where resources do not run a reservoir simulation as well as predicted at configuration and deployment, the model must often be paused or restarted while new resources are manually deployed.

It is with these observations in mind, among others, that aspects of the present disclosure were concerned and developed.

BRIEF DESCRIPTION OF THE DRAWINGS

The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 5 depicts a flowchart of a method for determining runtime estimates, in accordance with various embodiments of the subject technology;

DETAILED DESCRIPTION

Figure 1:
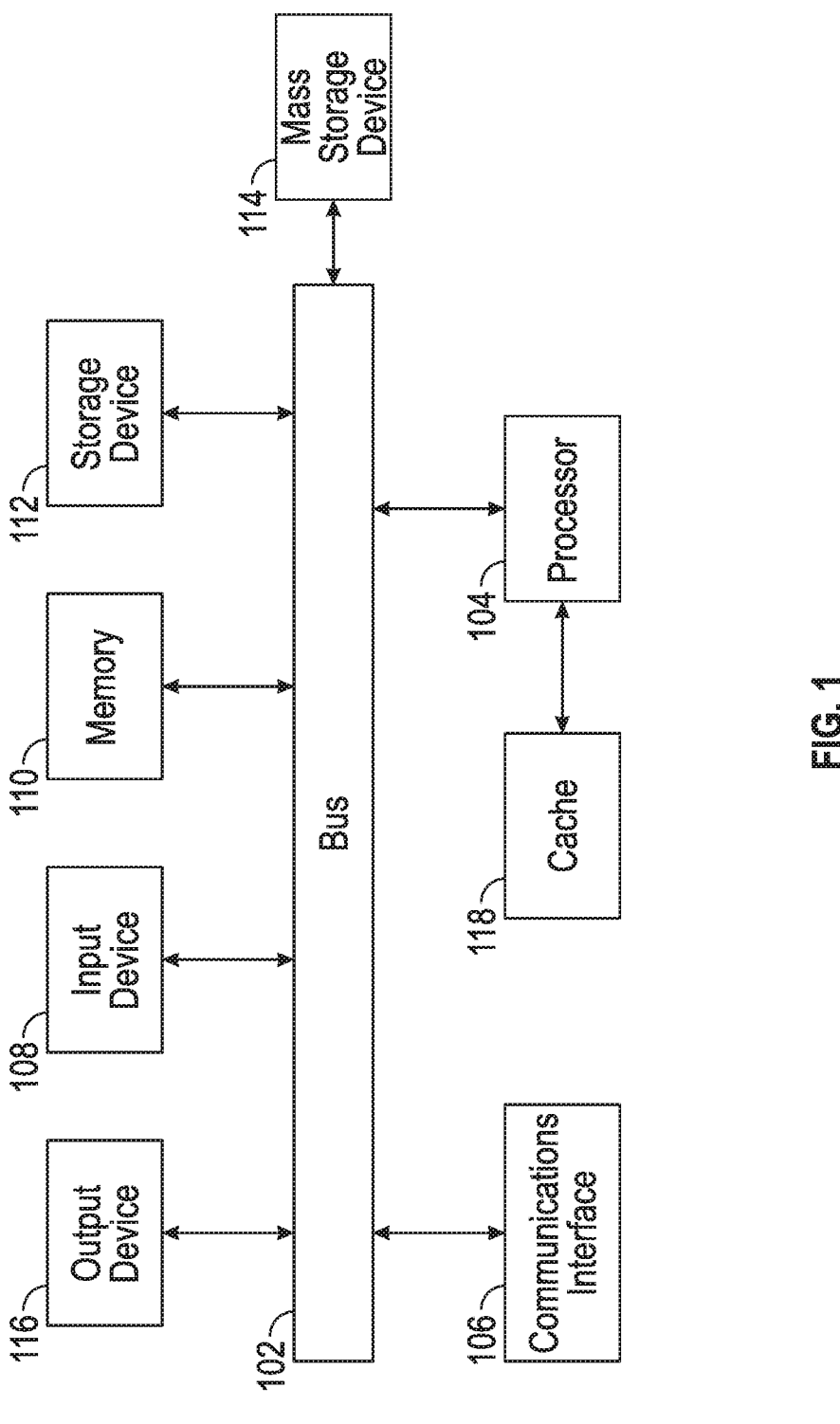
FIG. 1 is a system diagram illustrating a computing system, in accordance with various embodiments of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure provides techniques for allocating resources for running a simulation. Typically, a simulation may provide a representation of a dynamic state along a sequence of time, the sequence often divided into "time steps" where each time step represents a recalculation state of the parameters of the simulation. The simulation can provide a snapshot of the state at any given point in time as well as a predicted final state at the end of the simulation based on the original simulation parameters in combination with variations among the parameters due to interactions at times within the sequence of time for the simulation. For example, in the oil and gas industry, a reservoir of oil or gas can be simulated over a course of time in order to understand the effects of exploitation of the reservoir. Simulation parameters may include, for example and without imputing limitation, field sectors (e.g., surface areas above a reservoir where a drill site might be installed), sector size, flow state between sectors, reservoir pressure, reservoir depth, fluid contacts, fluids in place, drilling/completion strategies, extraction rate, and the like. Furthermore, reservoir simulations (and simulations generally) can include parameters external to the examined content. For example, a reservoir simulation may include further parameters such as global supply, global demand, local supply, pricing, cash flow, equipment prices, equipment operational costs, labor information, and the like.

Simulations are often run in order to make informed business decisions based on various parameters accordingly provided to the simulation. For example, reservoir simulations may be run to determine an equipment purchase order or as part of a due diligence prior to entering into a land contract. In some cases, a very limited window of time may be available for fully executing the simulation due to, for example, a fire sale or similar competitive sale with a brief time horizon.

Simulations may be run on cloud resources, both physical and virtualized, provided by third party vendors in order to minimize, or entirely remove, the cost of managing and maintaining computation resources, which can be large. Utilization of cloud resources also allows flexibility in simulation construction as resources can be allocated on an as needed basis. However, resources are typically priced by venders on a runtime basis. Furthermore, simply initializing a resource may impute a further initial cost.

Where time horizons are short or budgets are limited, it may be necessary to balance speed and cost. In some cases, simulations may take weeks or months to complete. Generally, the more resources allocated to a simulation, the faster the simulation may be completed. However, more resources can very quickly inflate the cost of running a simulation and, if the simulation is optimized for the particular resources or the combination of particular resources (e.g., lacking in certain multi-threading or multi-process optimizations and the like), many resources may go under- or unutilized and, in some cases, may negatively impact the performance of the simulation in terms of either speed or accuracy.

As disclosed herein simulations may be optimized by allocating resources in an improved manner. Runtimes for various simulation configurations and resource allocation schemes may be modeled in order to predict a total runtime of a simulation based on a relatively small sample of time steps. As more simulations are run, runtime models associated with the particular simulation parameters and/or resource allocation schemes may become more accurate (e.g., the models may learn or be trained). The trained models may then be used to predict optimal resource allocations based on simulation parameters and other criteria associated with the model (e.g., simulation budget and resource costs, complete-by dates for the simulation or phases of the simulation, and the like). Further, resources may be reallocated as the simulation is run in order to maximally optimize the simulation as the parameters vary throughout the full runtime of the simulation. For example, sectors of an oil field may be removed from a simulation parameters part way into the simulation due to an anticipated conclusion to a lease for the respective land. As a result, less RAM may be necessary for rapid read-write cycles due to a reduction in variables within the simulation and so RAM allocation may be reduced in order to minimize resource costs and also reduce the number of memory addresses used for cycles (thereby, providing a speed up in read-write times).

FIG. 1 is a schematic diagram of a computing system 100 that may implement various systems and methods discussed herein. The computing system 100 includes one or more computing components in communication via a bus 102. In one embodiment, the computing system 100 may include one or more process 104. The processor 104 can include one or more internal levels of cache 118 and a bus controller or bus interface unit to direct interaction with the bus 102. The processor 104 can specifically implement the various methods discussed herein. Memory 110 may include one or more memory cards and a control circuit, or other forms of removable memory, and can store various software applications including computer executable instructions, that when run on the processor 104 implement the methods and systems set out herein. Other forms of memory, such as a storage device 112 and a mass storage device 114, can also be included and accessible by the processor (or processors) 104 via the bus 102. The storage device 112 and mass storage device 114 can each contain any or all of the methods and systems, in whole or in part, discussed herein. In some examples, the storage device 112 or the mass storage device 114 can provide a database or repository in order to store data as discussed below.

The computing system 100 can further include a communications interface 106 by way of which the computing system 100 can connect to networks and receive data useful in executing the methods and systems set out herein as well as transmitting information to other devices. The computer system 100 can also include an input device 108 by which information is input. Input device 108 can be a scanner, keyboard, and/or other input devices as will be apparent to a person of ordinary skill in the art. The system set forth in FIG. 1 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Figure 2:
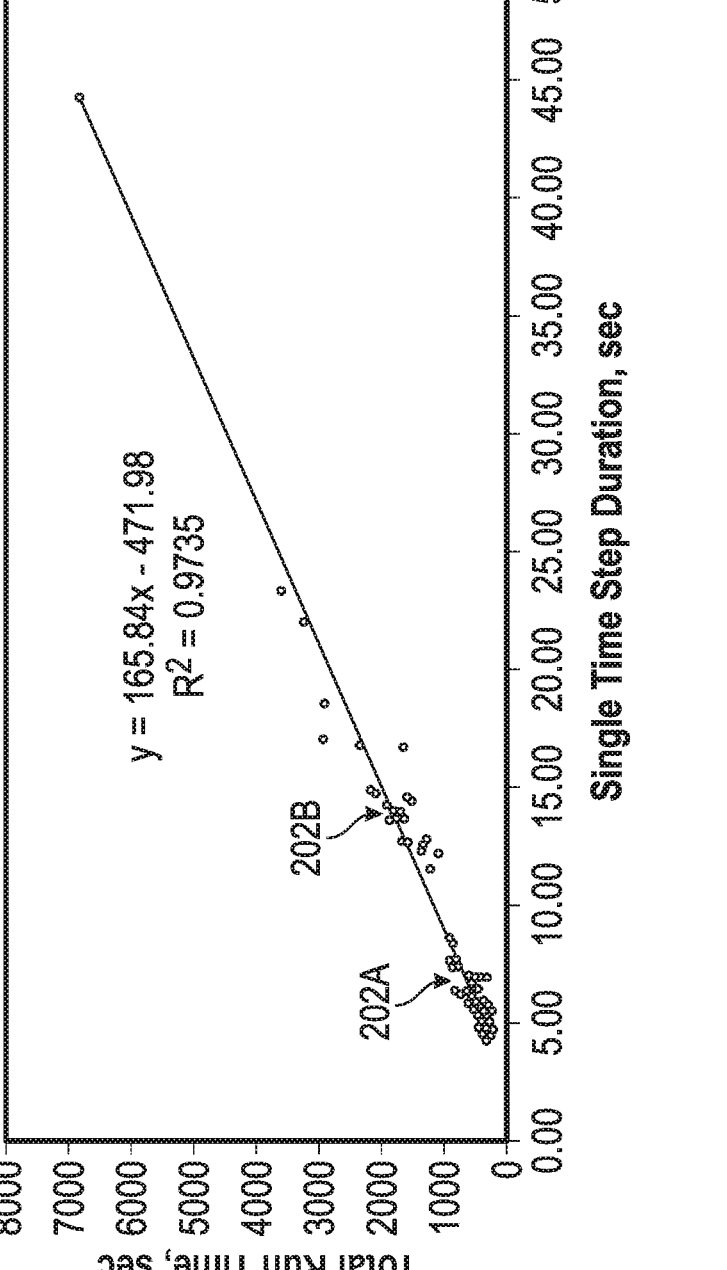
FIG. 2 depicts a scatterplot regressing total runtime against single time step duration for a reservoir simulation, in accordance with various embodiments of the subject technology.

Having described a typical computing system which may be employed by various systems and methods in accordance with those discussed herein, the disclosure will move to systems and methods for determining and optimizing the performance of a simulation. FIG. 2 depicts a graph 200 of the total runtime of a simulation against the time it takes for execution of a single time step of the simulation. As can be seen, a single time step can be used to predict a total runtime of a simulation with some predictive accuracy ($R^2=0.9735$). However, among clusters 202A and 202B, considerable variance may still be observed.

Figure 3:
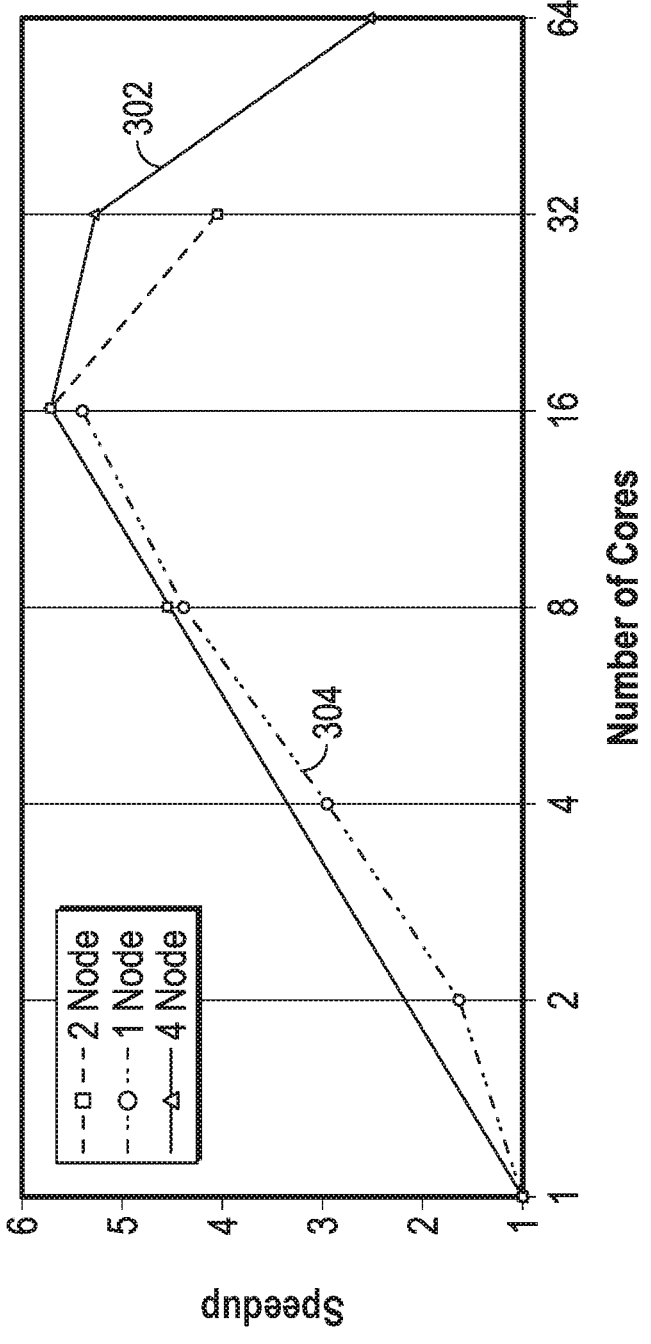
FIG. 3 depicts a graph of a speed increase of a reservoir simulation regressed against the number of cores used to run the reservoir simulation, in accordance with various embodiments of the subject technology.

FIG. 3 depicts a graph 300 of a speed up curve in relation to a number of processing cores per node utilized in running a simulation. As can be seen, the speed up per additional core is not an overall linear curve and also varies depending on node architecture. For example, the curve 302 of a four node architecture exhibits a largely linear speed up increase up to 16 cores but then has an increasingly negative effect for additional cores added thereafter. In comparison, the curve 304 of a single node architecture presents a curve that appears similar to a logarithmic curve.

In some embodiments, the curves of FIG. 2 and FIG. 3 may reflect only a single resource allotment and/or a single set of parameters of a model. In other words, other combinations of simulation parameters and resource allocation may present different graphs. Manually determining a model for each combination of simulation parameters and resource allocations may very quickly become impractical for even limited simulations on limited resources. For large simulations, like those found in the oil and gas industry or, in particular, reservoir simulations, and many potential resource allocation schemes, as provided by cloud computer, for example, fully or partially automated processes may increase the accuracy and robustness of models (e.g., speed up curves) for various simulations having various parameters and executed on various resource allocation schemes.

Figure 4:
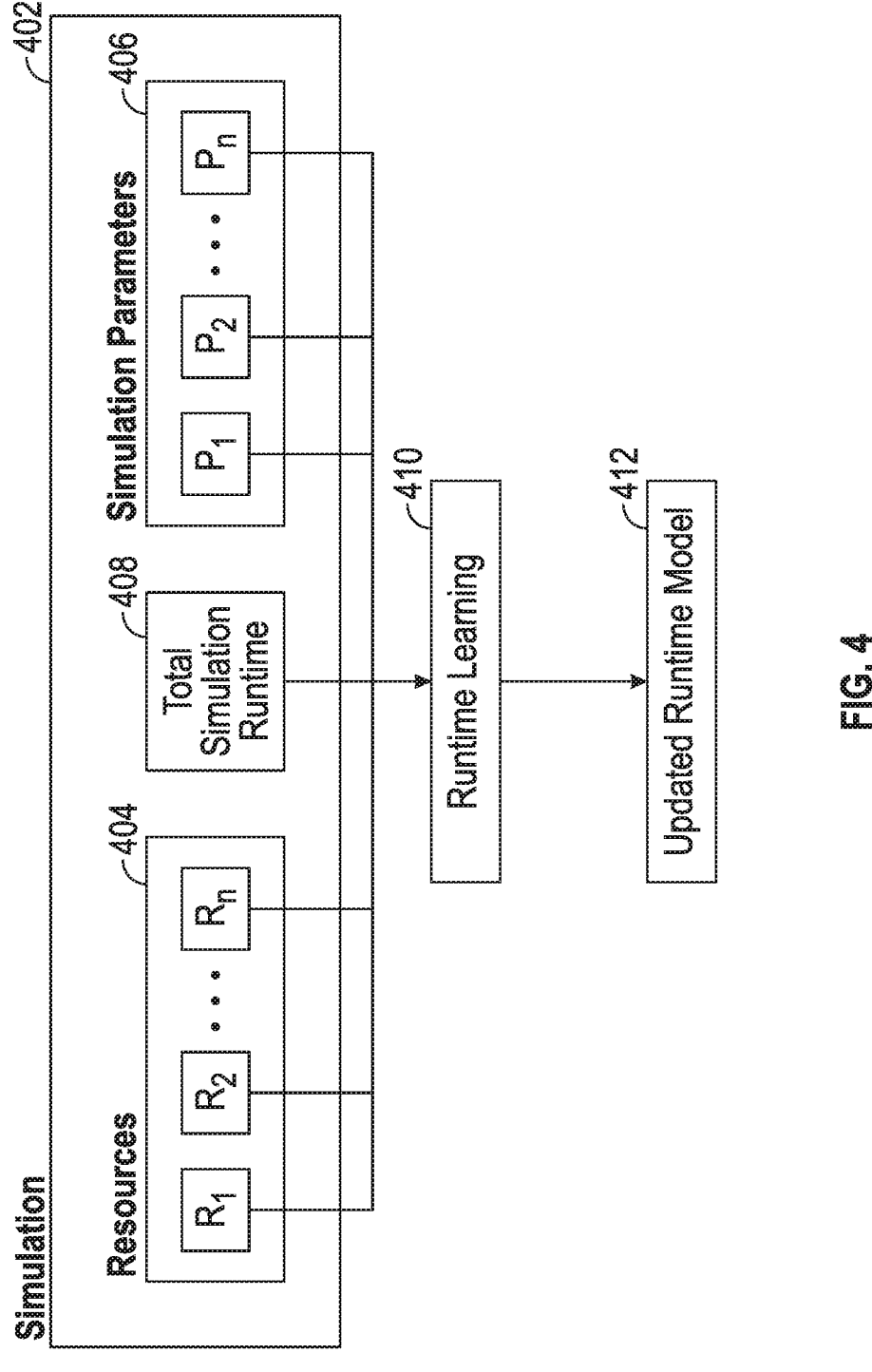
FIG. 4 is a system diagram illustrating a simulation runtime analysis, in accordance with various embodiments of the subject technology.

FIG. 4 is a schematic diagram of a runtime model update system 400 which can increase the predictive accuracy of runtime models and hasten the generation of runtime models. Multiple factors may ultimately impact a runtime of a simulation. Resource allocations as well as simulation parameters, as well as particular combinations of the two, may have an unexpected impact on the total runtime of a simulation.

A simulation run 402 can be provided to a runtime learning service 410 in order to update runtime models used to predict total runtimes of simulations including various variables and executed on various resources. For example, the correlation depicted by graph 200 may be generated by a runtime model produced by the system 400.

The simulation run 402 includes resource references 404 which may have mappings of any number and variety of resources. Each resource 414A-C may be provided as a mapped address or via a manifest document and the like. Resources can include components in a distributed computing system such as, without limitation, processors, storage devices, communications interfaces, and the like. In some embodiments, resources 414A-C may include hardware resources, software resources, virtualized resources (e.g., virtual machines and the like), or combinations thereof.

The simulation run 402 may also include parameter records 406 representing m variables processed and tracked by the simulation run 402 during runtime. Each parameter 416A-C may refer to particular variables considered in, for example, a reservoir simulation. The parameters 416A-C can include, without limitation, flow rates, field partition count, field partition size, pressure values, depth values, and the like. In some embodiments, each parameter record may include time series measurements such as, for example and without imputing limitation, compute time for each change of a particular variable over a run of the simulation. In some embodiments, identification or description of resources used in computations related to a particular variable may also be included in a respective parameter record.

A total simulation runtime 408 is included with the simulation run 402 and may be used by the runtime learning service 410 to further refine or improve runtime predictions. The runtime learning service 410 may receive the simulation run 402, including the resource references 404 and perform analytics on the received data. In some embodiments, the runtime learning service 410 can include a neural network to produce a predictive model using a plurality of received simulation runs 402.

The runtime learning service 410 may transmit updates to an updated runtime model 412. In some embodiments, the runtime learning may produce gradients to transmit to the updated runtime model 412. The gradients may be back propagated into an existing model in order to improve the overall predictive accuracy of the updated runtime model 412.

FIG. 5 is a flow diagram depicting a method 500 for estimating and/or optimizing a simulation runtime. In some embodiments, the method 500 may occur after a complete set of runtime models has been generated. In some embodiments, a default linear model may be used until sufficient data has been acquired from completing method 500 to provide a properly updated model.

In any case, a CPU runtime may be calculated for the first time step of a simulation (operation 502). In some embodiments, this can be done by timing the duration it takes to completely execute the first time step of the simulation. In some embodiments, a first set of time steps (e.g., the first five time steps) can be performed and the duration for each time step execution timed and then averaged in order to avoid tainting measurement data with an off chance outlier value.

Using the execution time of the initial time steps along with runtime models, a total CPU time to fully execute the runtime model may be generated (operation 504).

Parallelization gains from utilizing multiple nodes can be identified (operation 506) by, for example, referring to a model describing a speed up increase in relation to the number of processors and/or nodes used to execute a model. In other words, whether utilizing more nodes and, in some cases, more processors to execute the simulation in parallel processes, can speed up the total runtime of the simulation can be determined. In some embodiments, the graph 300 and the like may provide a basis for a prediction of a speed up increase.

The cost and runtime duration in the cloud of implementing one or more identified parallelization gains may be determined (operation 508). In some embodiments, the cost of a longer runtime on fewer resources may be less than the cost of a shorter runtime on more resources.

Based on the cost and runtime estimations, an appropriate resource allocation may be provided for running the simulation. The simulation can then be run on the cloud (operation 510). In some embodiments, resources and simulation optimizations can be dynamically allocated while the simulation is running in order to avoid repeating time step and other computations related to the running of the simulation.

Figure 6:
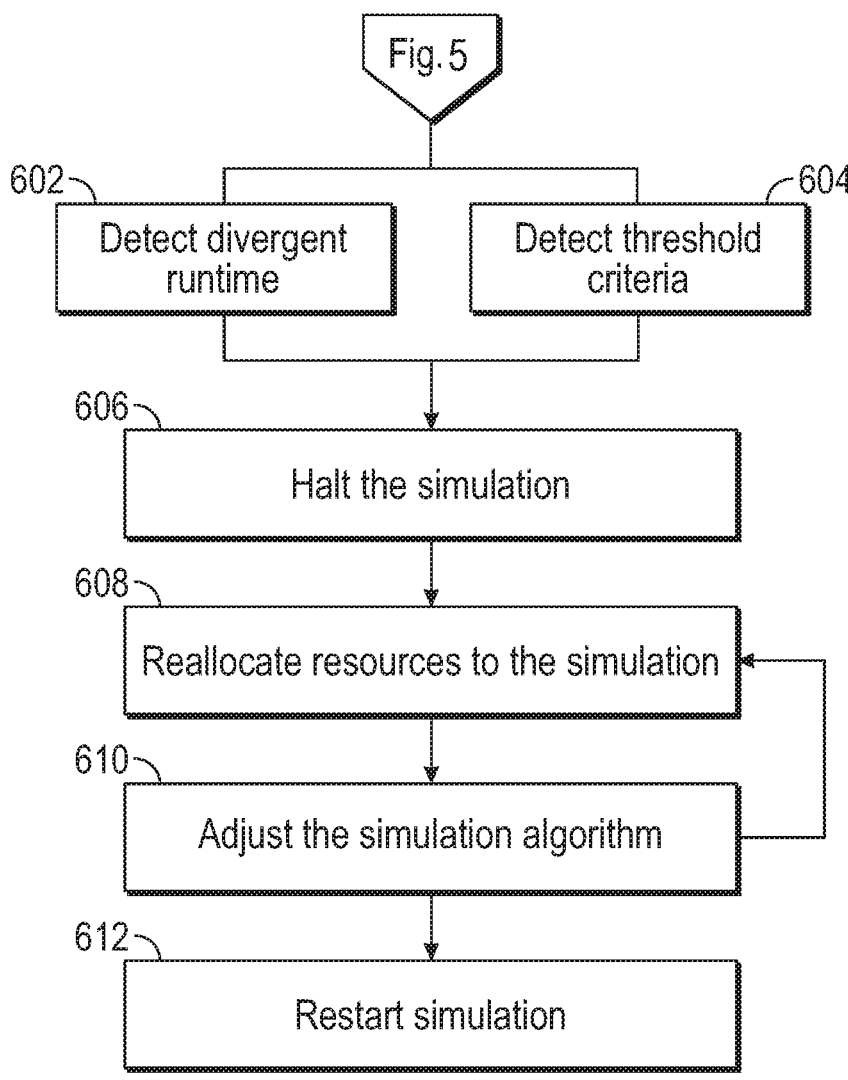
FIG. 6 depicts a flowchart of a method for dynamically optimizing a reservoir simulation run, in accordance with various embodiments of the subject technology.

FIG. 6 is a flow diagram depicting a method 600 for dynamically reallocating resources or making simulation optimizations "mid-run." Method 600 can be performed by a passive monitoring service upon detection of triggering events of the simulation. In some cases, a triggering event may be an intrinsic property of the simulation such as a runtime operating outside of predicted bounds. In other cases, the triggering even can be an anticipated simulation result of intended modification of the simulation according to a plan.

The 600 may occur during or as part of method 500 and, in particular, during the running of the simulation on the cloud (operation 510), a divergent runtime can be detected (operation 602). A divergent runtime may be defined as an execution time of a single time step being outside of certain predetermined bounds. In some embodiments, runtime divergence may be determined by aggregating a moving average and checking that it is within certain predetermined bounds. In other embodiments, particular statistical conditions may be included in determining whether a single or aggregated runtime value is outside the predetermined bounds such as total deviation from the runtime average, a frequency of deviation, and other similar considerations in order to avoid false positives due to tail events (e.g., rarely occurring but highly divergent events that, nonetheless, fall within a predicted curve).

Alternatively, or simultaneously, a threshold criterion may be detected (operation 604). Threshold criteria can be determined prior to executing the simulation. In some embodiments, threshold criteria can be, for example, anticipated demand reductions (e.g., due to expected trade policy decisions external the simulation itself) or lease event dates for drill sites (e.g., a lease for a particular drill site may be known to expire at a certain time and a reservoir simulation may include changes in extraction patterns as a result at a time when the simulation approaches the anticipated date). As a result, various parameters may be modified, added, or removed and thus impact optimal resource allocation for execution of the simulation. In either case, the simulation may be halted as a result (operation 606) in order to optimize the simulation and/or the resources executing it.

The simulation halted, resources may then be reallocated accordingly (operation 608). Using runtime models produced by the system 400 with updated parameters due to the detected threshold criteria or because of a runtime diverging from the prediction, new or alternative resources may be allocated. Where the runtime diverges from the model, an allocation associated with a different, albeit largely similar, runtime curve may be provided.

Figure 7:
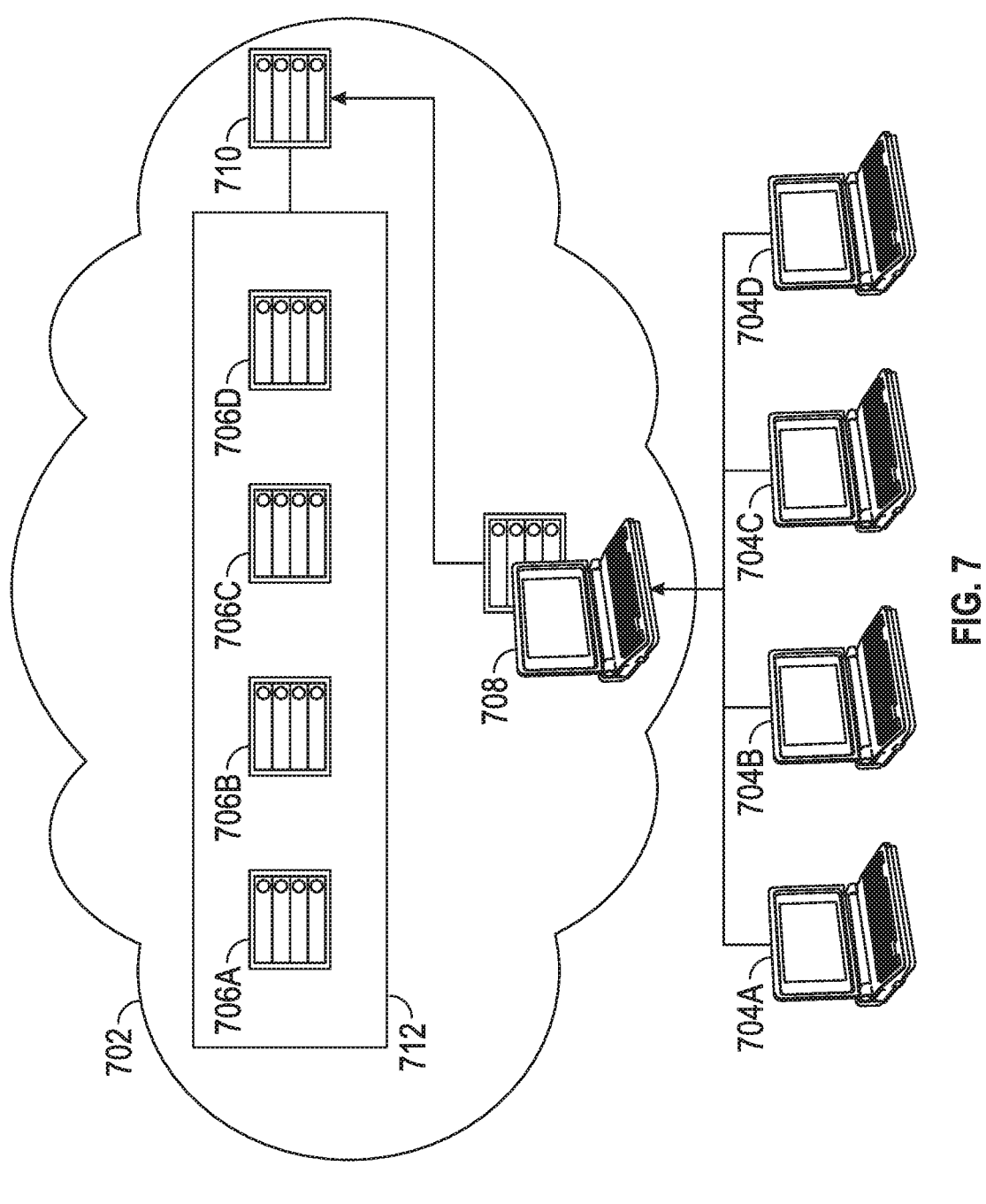
FIG. 7 illustrates a cloud computing architecture, in accordance with various embodiments of the subject technology.

FIG. 7 is a diagram illustrating a resource reallocation that may be performed by a system 700 for managing simulation resources. The simulation may be monitored through a management portal 708 which client devices 704A-D can connect to remotely. The management portal 708 can manage client requests for provision to a head node 710 which controls a resource cluster 712. The resource cluster 712 may include multiple slave nodes 706A-D and the head node

710 can allocate or relocate tasks across the slave nodes 706A-D as requested by the client devices 704A-D. For example, the client devices 704A-D may, either individually or in tandem, perform the method 500 and, as a result, transmit an optimized simulation and/or resource allocation requests to the head node 710 via the web portal 708.

Returning to FIG. 6, modifications of an underlying algorithm (e.g., modifications of the logic of the algorithm) of the simulation may also be adjusted (operation 610). In cases where the simulation is being updated due to a criterion threshold detection via operation 604, adjustment of the simulation algorithm may provide the significant bulk of runtime improvement. A parser may be used to review the simulation source code for particular optimizations. In some embodiments, the parser may be the same as is used to prepare the simulation for initial execution.

In some cases, the adjustment of the simulation algorithm via operation 610, may cause a further reallocation of resources via operation 608. Further, a repeated iteration of resource reallocation may further cause a further reiteration of algorithm optimizations, thus triggering an optimization loop. In some embodiments, the loop may be allowed to continue until no more optimizations are detected. In other embodiments, the loop may be limited by a hard limit such as a maximum number of loops or a reactive limit such as a minimum percentage anticipated improvement or the like.

Once optimizations have completed, the simulation may be restarted (operation 612). In some embodiments, the simulation will restart from the same point at which it was halted in order to facilitate seamless execution of the simulation and minimize redundant efforts. In other embodiments, the simulation may restart from a preceding time step in order to compare the optimized execution to the known execution preceding optimizations. Where comparisons are conducted, a buffer for storing a most recent simulation state or states and/or time step execution speed or speeds may provide historical values to compare against the optimized simulation execution. In some other embodiments, the simulation may be restarted from the very beginning in order to provide a consistent resource allocation and execution state throughout the entire life cycle of the simulation.

Returning to FIG. 5, once the simulation has completed execution, runtime models may be updated according to the runtime of the completed simulation (operation 512). In some embodiments, the total simulation runtime may be used to update a single configuration and simulation model. In other embodiments, multiple runtime models may be updated based on changes to resources, model parameters, and/or the simulation algorithm as performed by the method 600 for dynamically updating and optimizing simulations.

The updates may be processed by the system 400 for updating runtime models. For example, a total simulation runtime for each particular configuration and set of parameters of an iteration of the simulation can be provided to the runtime learning service 410. In some embodiments, a count of the total number of time steps may be provided along with the total simulation runtime in order to account for multiple simulation configurations due to the dynamic reallocation and optimization method 600.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various examples of the disclosure or described with different terminology. These and other variations, modifications, additions, and improvements may fall within the scope of the disclosure as defined in the claims that follow.

What is claimed is:

1. A method for allocating resources to a simulation, the method comprising:
   receiving a simulation for execution, the simulation comprising a parameter having a state;
      calculating an initial runtime of an initial time step of the simulation, the initial time step comprising a calculated initial update of the parameter state and the initial runtime comprising a duration of time taken to complete the initial time step;
      determining a total runtime of the simulation based on the initial runtime, the total runtime comprising a predicted duration of time taken to complete a full run of the simulation;
   determining a cost of the simulation based on one or more calculated parallelization gains;
      selecting a runtime model, the selection based on the initial time step and the parameter;
      identifying, based on the selected runtime model and the determined cost, an allocation of a resource;
      allocating the identified resource for execution of the simulation;
      executing the simulation using the allocated resource;
      dynamically allocating one or more simulation optimizations while executing the simulation based on detecting one or more triggering events, wherein the one or more triggering event comprises a runtime of the simulation operating outside of a predicted bounds; and
      dynamically optimizing the simulation while executing the simulation to further optimize the simulation.

2. The method of claim 1, wherein the simulation comprises multiple parameters and the state of each parameter is dependent upon the state of one or more others of the multiple parameters.

3. The method of claim 1, further comprising updating the runtime model based on a final execution runtime of the executed simulation.

4. The method of claim 3, wherein the update is based on metadata from the simulation, the metadata comprising one of the simulation parameter, the selected runtime model, the initial runtime, the final execution runtime, and the allocated resource.

5. The method of claim 1, further comprising:
   halting the simulation;
   identifying, based on the selected runtime model, a second allocation of a resource;
   allocating the second resource for execution of the simulation; and
   restarting the simulation using the allocated second resource.

6. The method of claim 5, further comprising:
   modifying an execution logic of the simulation, the execution logic comprising simulation runtime instructions for calculating the state of the parameter.

7. The method of claim 5, further comprising detecting a runtime divergence from a predicted runtime provided by the runtime model.

8. The method of claim 5, further comprising detecting a threshold criterion of the simulation, the threshold criterion provided prior to execution of the simulation.

9. The method of claim 1, wherein the runtime model is a trained neural network.

10. A system for allocating resources to a simulation, the system comprising:
   a processor; and
   a memory storing instructions that, when executed by the processor, cause the processor to:
   receive a simulation for execution, the simulation comprising a parameter having a state;
   calculate an initial runtime of an initial time step of the simulation, the initial time step comprising a calculated initial update of the parameter state and the initial runtime comprising a duration of time taken to complete the initial time step;
   determine a total runtime of the simulation based on the initial runtime, the total runtime comprising a predicted duration of time taken to complete a full run of the simulation;
determine a cost of the simulation based on one or more calculated parallelization gains;
   select a runtime model, the selection based on the initial time step and the parameter;
   identify, based on the selected runtime model and the determined cost, an allocation of a resource;
   allocate the identified resource for execution of the simulation;
   execute the simulation using the allocated resource;
dynamically allocate one or more simulation optimizations while executing the simulation based on detecting one or more triggering events, wherein the one or more triggering event comprises a runtime of the simulation operating outside of a predicted bounds; and
   dynamically optimize the simulation while executing the simulation to further optimize the simulation.

11. The system of claim 10, wherein the simulation comprises multiple parameters and the state of each parameter is dependent upon the state of one or more others of the multiple parameters.

12. The system of claim 10, wherein the instructions, when executed by the processor, further cause the processor to update the runtime model based on a final execution runtime of the executed simulation.

13. The system of claim 12, wherein the update is based on metadata from the simulation, the metadata comprising one of the simulation parameter, the selected runtime model, the initial runtime, the final execution runtime, and the allocated resource.

14. The system of claim 10, wherein the instructions, when executed by the processor, further cause the processor to:
   halt the simulation;
   identify, based on the selected runtime model, a second allocation of a resource;
   allocate the second resource for execution of the simulation; and
   restart the simulation using the allocated second resource.

15. The system of claim 14, wherein the instructions, when executed by the processor, further cause the processor to:

modify an execution logic of the simulation, the execution logic comprising simulation runtime instructions for calculating the state of the parameter.

16. The system of claim 14, wherein the instructions, when executed by the processor, further cause the processor to detect a runtime divergence from a predicted runtime provided by the runtime model.

17. The system of claim 14, wherein the instructions, when executed by the processor, further cause the processor to detect a threshold criterion of the simulation, the threshold criterion provided prior to execution of the simulation.

18. The system of claim 10, wherein the runtime model is a trained neural network.

19. A non-transitory tangible computer-readable storage medium including instructions, that when executed by a computer configured to run a simulation, cause the computer to:
   receive a simulation for execution, the simulation comprising multiple parameters each having a state, wherein the state of each parameter is dependent upon the state of one or more others of the multiple parameters;
   calculate an initial runtime of an initial time step of the simulation, the initial time step comprising a calculated initial update of the parameter states and the initial runtime comprising a duration of time taken to complete the initial time step;
   determine a total runtime of the simulation based on the initial runtime, the total runtime comprising a predicted duration of time taken to complete a full run of the simulation;
determine a cost of the simulation based on one or more calculated parallelization gains;
   select a runtime model, the selection based on one of the initial time step and one or more of the multiple parameters;
   identify, based on the selected runtime model and the determined cost, an allocation of a resource;
   allocate the identified resource for execution of the simulation;
   execute the simulation using the allocated resource;
dynamically allocate one or more simulation optimizations while executing the simulation based on detecting one or more triggering events, wherein the one or more triggering event comprises a runtime of the simulation operating outside of a predicted bounds;
   dynamically optimize the simulation while executing the simulation to further optimize the simulation;
   detect one of a runtime divergence from a predicted runtime provided by the runtime model and a provided threshold criterion;
   halt the simulation;
   identify, based on the selected runtime model, a second allocation of a resource;
   allocate the second resource for execution of the simulation; and
   restart the simulation.

20. The non-transitory tangible computer-readable storage medium of claim 19, including additional instructions that, when executed by a computer configured to run a simulation, cause the computer to modify an execution logic of the simulation, the execution logic comprising simulation runtime instructions for calculating a state of a one of the multiple parameters.

* * * * *